(12) United States Patent
Singh et al.

(10) Patent No.: US 12,046,019 B2
(45) Date of Patent: Jul. 23, 2024

(54) SURFACE AUTOMATION IN BLACK BOX ENVIRONMENTS

(71) Applicant: SAP SE, Walldorf (DE)

(72) Inventors: Mithilesh Kumar Singh, Ara (IN); Anubhav Sadana, New Delhi (IN); Deepak Pandian, Bangalore Urban (IN); Raghavendra D, Kalaburgi (IN); Satyadeep Dey, Bangalore (IN); Philippe Long, Saint Germain les Arpajon (FR)

(73) Assignee: SAP SE, Walldorf (DE)

( * ) Notice: Subject to any disclaimer, the term of this patent is extended or adjusted under 35 U.S.C. 154(b) by 151 days.

(21) Appl. No.: 17/157,392

(22) Filed: Jan. 25, 2021

(65) Prior Publication Data
US 2022/0237404 A1    Jul. 28, 2022

(51) Int. Cl.
| | | |
|---|---|---|
| *G06V 30/40* | (2022.01) | |
| *G06F 9/451* | (2018.01) | |
| *G06F 18/22* | (2023.01) | |
| *G06V 10/75* | (2022.01) | |
| *G06V 20/62* | (2022.01) | |
| *G06V 30/10* | (2022.01) | |

(52) U.S. Cl.
CPC .......... *G06V 10/751* (2022.01); *G06F 9/451* (2018.02); *G06F 18/22* (2023.01); *G06V 20/62* (2022.01); *G06V 30/10* (2022.01)

(58) Field of Classification Search
CPC ...... G06V 10/751; G06V 10/10; G06V 10/20; G06V 20/62; G06V 30/10; G06V 30/40; G06V 30/41; G06V 30/1448; G06F 9/451; G06K 9/6215
See application file for complete search history.

(56) References Cited

U.S. PATENT DOCUMENTS

| | | | |
|---|---|---|---|
| 6,778,703 B1 * | 8/2004 | Zlotnick ............... | G06V 30/412 382/218 |
| 10,984,233 B2 * | 4/2021 | Arakawa ............... | G06V 30/412 |
| | (Continued) | | |

OTHER PUBLICATIONS

F. Macchi, P Rosin, J. M. Mervi and L. Turchet, "Image-based Approaches for Automating GUI Testing of Interactive Web-based Applications," 2021 28th Conference of Open Innovations Association (FRUCT), Moscow, Russia, 2021, pp. 278-285, doi: 10.23919/FRUCT50888.2021.9347592. (Year: 2021).*

(Continued)

*Primary Examiner* — Molly Wilburn
*Assistant Examiner* — Ahmed A Nasher
(74) *Attorney, Agent, or Firm* — Sterne, Kessler, Goldstein & Fox P.L.L.C.

(57) ABSTRACT

Disclosed herein are system, method, and computer program product embodiments for surface automation in black box environments. An embodiment operates by determining scenarios of an application for automation; detecting the scenario during an execution of an application; capturing and storing one or more user interface screenshots of the scenario; identifying and storing user interface information from the user interface screenshot; implementing a sequential set of instructions comprising at least one textual element detection technique and at least one non-textual element detection technique; and executing the sequential set of instructions.

20 Claims, 8 Drawing Sheets

600

(56) References Cited

U.S. PATENT DOCUMENTS

| | | | |
|---|---|---|---|
| 11,113,557 B2* | 9/2021 | Saft | G06V 30/153 |
| 2017/0011264 A1* | 1/2017 | Smolic | G11B 27/105 |
| 2021/0182089 A1* | 6/2021 | Voicu | G06N 3/08 |
| 2022/0032471 A1* | 2/2022 | Singh | G06F 3/0484 |
| 2022/0129691 A1* | 4/2022 | Kim | G06V 10/751 |

OTHER PUBLICATIONS

Arica, N. et al., "Optical Character Recognition for Cursive Handwriting," IEEE Transactions on Pattern Analysis and Machine Intelligence, vol. 24, No. 6, pp. 801-813, Jun. 2002.

Atallah, M.J., "Faster Image Template Matching in the Sum of the Absolute Value of Differences Measure," IEEE Transactions on Image Processing, vol. 10, No. 4, pp. 659-663, Apr. 2001.

Bao, G. et al., "Multi-template matching algorithm for cucumber recognition in natural environment," Computers and Electronics in Agriculture, 127, pp. 754-762, Sep. 2016.

Berger, M. and Danuser, G., "Deformable Multi Template Matching with Application to Portal Images," Proceedings of IEEE Computer Society Conference on Computer Vision and Pattern Recognition, pp. 374-379, Jun. 1997.

Bradski, G., "The OpenCV Library," Dr. Dobb's, Journal of Software Tools, from https://drdobbs.com/article/print?articleId=184404319&siteSectionName=open-source, 6 pages, Nov. 1, 2000.

Briechle, K. and Hanebeck, U.D., "Template Matching using Fast Normalized Cross Correlation," Optical Pattern Recognition XII, vol. 4387, pp. 95-102, International Society for Optics and Photonics, Mar. 2001.

Caulfield, H.J. and Maloney, W.T., "Improved Discrimination in Optical Character Recognition," Applied Optics, vol. 8, No. 11, pp. 2354-2356, Aug. 7, 1969.

Cer, D., et al., "Universal Sentence Encoder," arXiv:1803.11175v2 [cs.CL], 7 pages, Apr. 12, 2018.

Chen, C.S., et al., "Template Matching using Statistical Model and Parametric Template for Multi-Template," Journal of Signal and Information Processing, vol. 4, pp. 52-57, Aug. 2013.

Chen, J.H., et al., "Fast Algorithm for Robust Template Matching With M-Estimators," IEEE Transactions on Signal Processing, vol. 51, No. 1, pp. 230-243, Jan. 2003.

Chen, Y.S., et al., "Fast Block Matching Algorithm Based on the Winner-Update Strategy," IEEE Transactions on Image Processing, vol. 10, No. 8, pp. 1212-1222, Aug. 2001.

Devlin, J., et al., "BERT: Pre-training of Deep Bidirectional Transformers for Language Understanding," arXiv:1810.04805v2 [cs.CL], 16 pages, May 24, 2019.

Di Stefano, L., et al., "ZNCC-based template matching using bounded partial correlation," Pattern Recognition Letters, vol. 26, pp. 2129-2134, May 3, 2005.

Epshtein, B., et al., "Detecting Text in Natural Scenes with Stroke Width Transform," 2010 IEEE Computer Society Conference on Computer Vision and Pattern Recognition pp. 2963-2970, 2010.

He, K., et al., "Mask R-CNN," arXiv:1703.06870v3 [cs.CV], 12 pages, Jan. 24, 2018.

Jurie, F. and Dhome, M., "Real Time Robust Template Matching," BMVC, vol. 2002, pp. 123-132, Sep. 2002.

Karaoglu, S., et al., "Object Reading: Text Recognition for Object Recognition," European Conference on Computer Vision, pp. 456-465, Springer, Berlin, Heidelberg, Oct. 2012.

Lin, C.H. and Wu, J.L., "A Lightweight Genetic Block—Matching Algorithm for Video Coding," IEEE Transactions on Circuits and Systems for Video Technology, vol. 8, No. 4, pp. 386-392, Aug. 1998.

Lin, Y.H., et al., "New method for subpixel image matching with rotation invariance by combining the parametric template method and the ring projection transform process," Optical Engineering, vol. 45(6), p. 067202-1-067202-9, Jun. 2006.

Lin, Y.H. and Chen, C.H., "Template matching using the parametric template vector with translation, rotation and scale invariance," Pattern Recognition, vol. 41(7), pp. 2413-2421, 2008.

Liu, W., et al., "SSD: Single Shot Multibox Detector," arXiv:1512.02325v5 [cs.CV], 17 pages, Dec. 29, 2016.

Mithe, R., et al., "Optical Character Recognition," International Journal of Recent Technology and Engineering (IJRTE), ISSN: 2277-3878 (Online), vol. 2, Issue 1, pp. 72-75, Mar. 2013.

Omachi, S. and Omachi, M., "Fast Template Matching With Polynomials," IEEE Transactions on Image Processing, vol. 16, No. 8, pp. 2139-2149, Aug. 2007.

Patel, C., et al.., "Optical Character Recognition by Open Source OCR Tool Tesseract: A Case Study," International Journal of Computer Applications, vol. 55, No. 10, pp. 50-56, Oct. 2012.

Pennington, J., et al., "GloVe: Global Vectors for Word Representation," Proceedings of the 2014 Conference on Empirical Methods in Natural Language Processing (EMNLP), pp. 1532-1543, Oct. 25-29, 2014.

Pereira, S. and Pun, T., "Robust Template Matching For Affine Resistant Image Watermarks," IEEE Transactions on Image Processing, vol. 9, No. 6, pp. 1123-1129, Jun. 2000.

Redmon, J., et al., "You Only Look Once: Unified, Real-Time Object Detection," arXiv:1506.02640v5 [cs.CV], 10 pages, May 9, 2016.

Ren, S., et al., "Faster R-CNN: Towards Real-Time Object Detection with Region Proposal Networks," arXiv:1506.01497vs [cs.CV], 14 pages, Jan. 6, 2016.

Sandler, M., et al., "MobileNetV2: Inverted Residuals and Linear Bottlenecks," arXiv:1801.04381v4 [cs.CV], 14 pages, Mar. 21, 2019.

Sarvaiya, J.N., et al., "Image Registration By Template Matching Using Normalized Cross-Correlation," 2009 International Conference on Advances in Computing, Control, and Telecommunication Technologies, pp. 819-822, IEEE, Dec. 2009.

Tan, M., et al., "EfficientDet: Scalable and Efficient Object Detection," arXiv:1911.09070v7 [cs.CV], 10 pages, Jul. 27, 2020.

Wahl, F.M., et al., "Block Segmentation and Text Extraction in Mixed Text/Image Documents," Computer Graphics and Image Processing, vol. 20, pp. 375-390, 1982.

Wilson, C.L., "Evaluation of Character Recognition Systems," Neural Networks for Signal Processing III—Proceedings of the 1993 IEEE-SP Workshop, pp. 485-496, IEEE, Sep. 1993.

Wu, B., et al., "SqueezeDet: Unified, Small, Low Power Fully Convolutional Neural Networks for Real-Time Object Detection for Autonomous Driving," arXiv:1612.01051v4 [cs.CV], 12 pages, Jun. 11, 2019.

Yi, J., et al., "Color-based Clustering for Text Detection and Extraction in Image," Proceedings of the 15th ACM International Conference on Multimedia, pp. 847-850, Sep. 2007.

\* cited by examiner

SURFACE AUTOMATION IN BLACK BOX ENVIRONMENTS

BACKGROUND

Robotic Process Automation ("RPA") is the process of automating and standardizing repetitive processes in an application with the use of software bots. There have been significant challenges with applying RPA in black box environments. With the advent of virtualization, a large number of enterprises opt for virtual environments to provide enhanced security and compliance along with high availability at low cost. Applications used in virtualization software are typically installed on a server on a network. While these user interface elements are visible, the object properties will not be accessible because it is protected by a secure Virtual Private Network layer. This is one example of a black box environment where the power of RPA cannot be applied.

RPA tools are also challenging to implement in tricky environments such as virtual machines and remote desktops or when using legacy applications in which the use of interfaces are limited. Identification and manipulation of different application elements is performed with underlying technology handles in the case of web applications. These techniques can only be used if the application is installed on the same computer as the software bot. Outside of these environments, the typical approach to interacting with applications is to use application technology specific APIs to build knowledge metadata. However, this typical approach cannot be applied in black box environments. In black box environments, the technical understanding or application programming interfaces of the applications cannot be obtained.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for surface automation in black box environments. Generally, when black box environments are used for RPA, a solution is needed to directly capture an information and metadata from an application's user interface. Therefore, automation in black box environments generally involves taking a screenshot of the applications and understanding the controls available inside the screenshots using image processing algorithms.

This process is called surface automation. Surface automation is the process of enabling automation with the help of images. It can use a variety of artificial intelligence techniques, i.e., computer vision, optical character recognition, object detection, natural language processing, etc., to detect and recognize different structural and semantic elements on an application's page. This information is in turn used to build automations for enterprises.

There is a growing need for surface automation in the industry, especially in cases where RPA is restricted to viewing the images sent from a remote session or when the RPA software cannot get object properties due to technology constraints in web applications and legacy technologies. This solution can uniquely identify single or multiple occurrences of text, pattern, and interactive elements in images. Surface automation is a powerful tool to improve RPA in a growing number of uses cases that are limited by the current capabilities of RPA.

Figure 1:
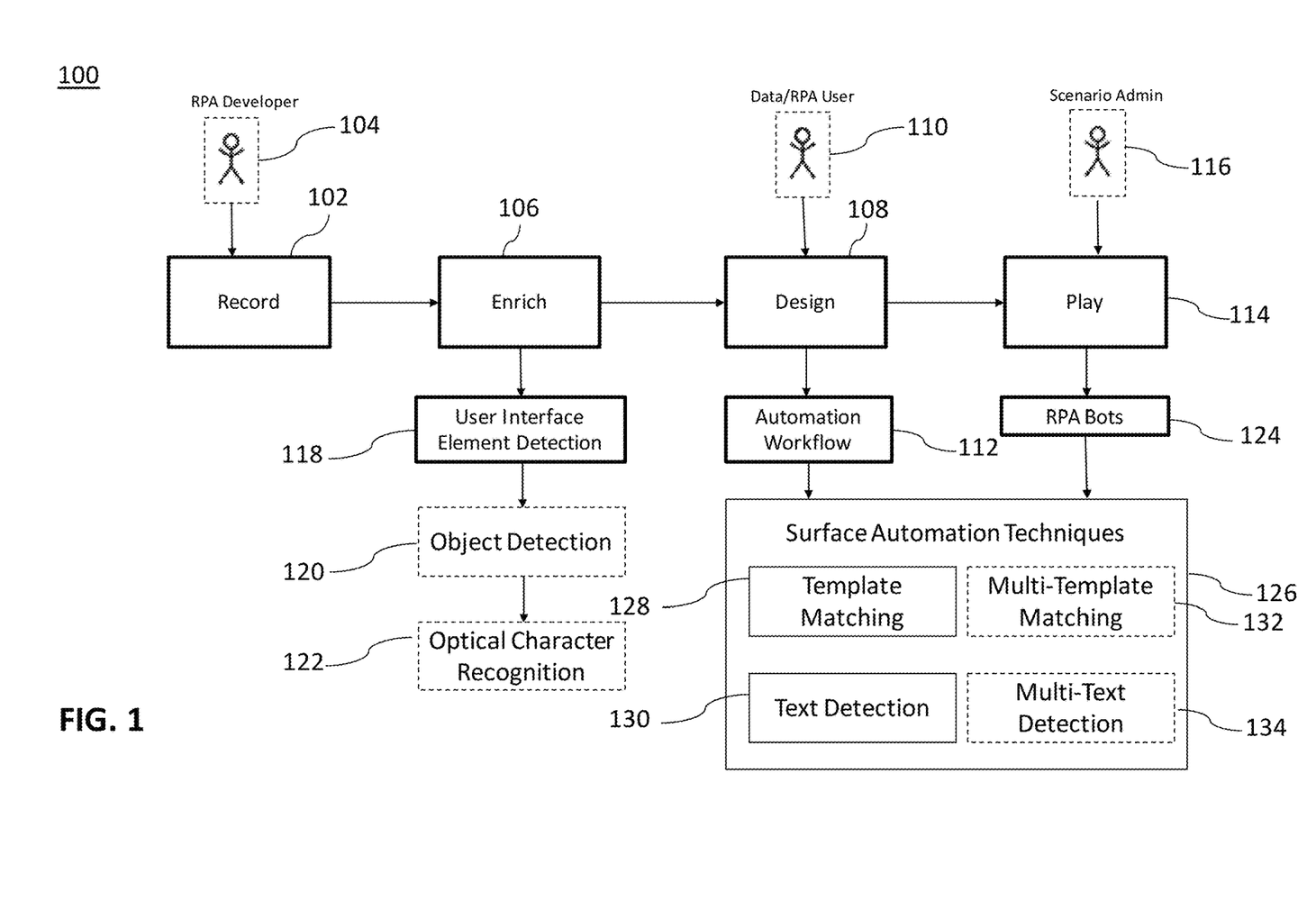
FIG. 1 is a block diagram illustrating a system for surface automation in black box environments, according to some embodiments.

FIG. 1 a block diagram illustrating a system 100 for surface automation in black box environments, according to some embodiments. There are four stages involved in building an intelligent automation with the use of surface automation. In some embodiments, the recording phase 102 involves an RPA developer 104 that determines a scenario in an application where user interface screenshots and corresponding events on an application page are captured and stored.

The enrich phase 106 extracts user interface information and data from the screenshots 118 obtained from the recording phase 102 using artificial intelligence. In some embodiments, this information can include the position of the image elements, text, area, type of different controls present on the screen. In many embodiments, object detection 120 is used to identify the user interface elements. Object detection is an image processing technique that can be used to identify and locate objects in an image. Object detection draws a bounded box around each object of interest, i.e. textual elements and non-textual elements, in an image and assigns them a class label. In an embodiment, optical character recognition 122 is used to extract all textual elements in the user interface screenshots 118. Optical character recognition is the electronic or mechanical conversion of various types of text, i.e. images of typed text, handwritten or printed text into machine-encoded text, a photo of a document, or text superimposed on an image.

During the design phase 108, an automation workflow 112 may be created, according to some embodiments. An automation workflow 112 may comprise of a series of repeatable tasks in an application. An automation workflow 112 may be modified using data 110 obtained during the recording phase 102 or enrichment phase 106, in some other embodiments. In some embodiments, the automation workflow 112 is modified with new data 110 such that automation is performed in a generic manner with different sets of data for the same scenario. In other embodiments, the automated workflow incorporates data 110 to make the workflow more resilient to small changes in scenarios during runtime.

During the design phase, an automation workflow implements surface automation techniques 126 including template matching 128, text detection 130, multi-template matching 132, or multi-text detection 134. In an embodiment, an RPA bot capable of performing the programmed set of actions in the automated workflow is created 124.

During the play phase 114, the automation workflow within the bot script 124 executes and performs the designated process. In some embodiments, the script execution is triggered by a RPA scenario administrator 116 responsible for executing certain scenarios in an application.

Figure 2:
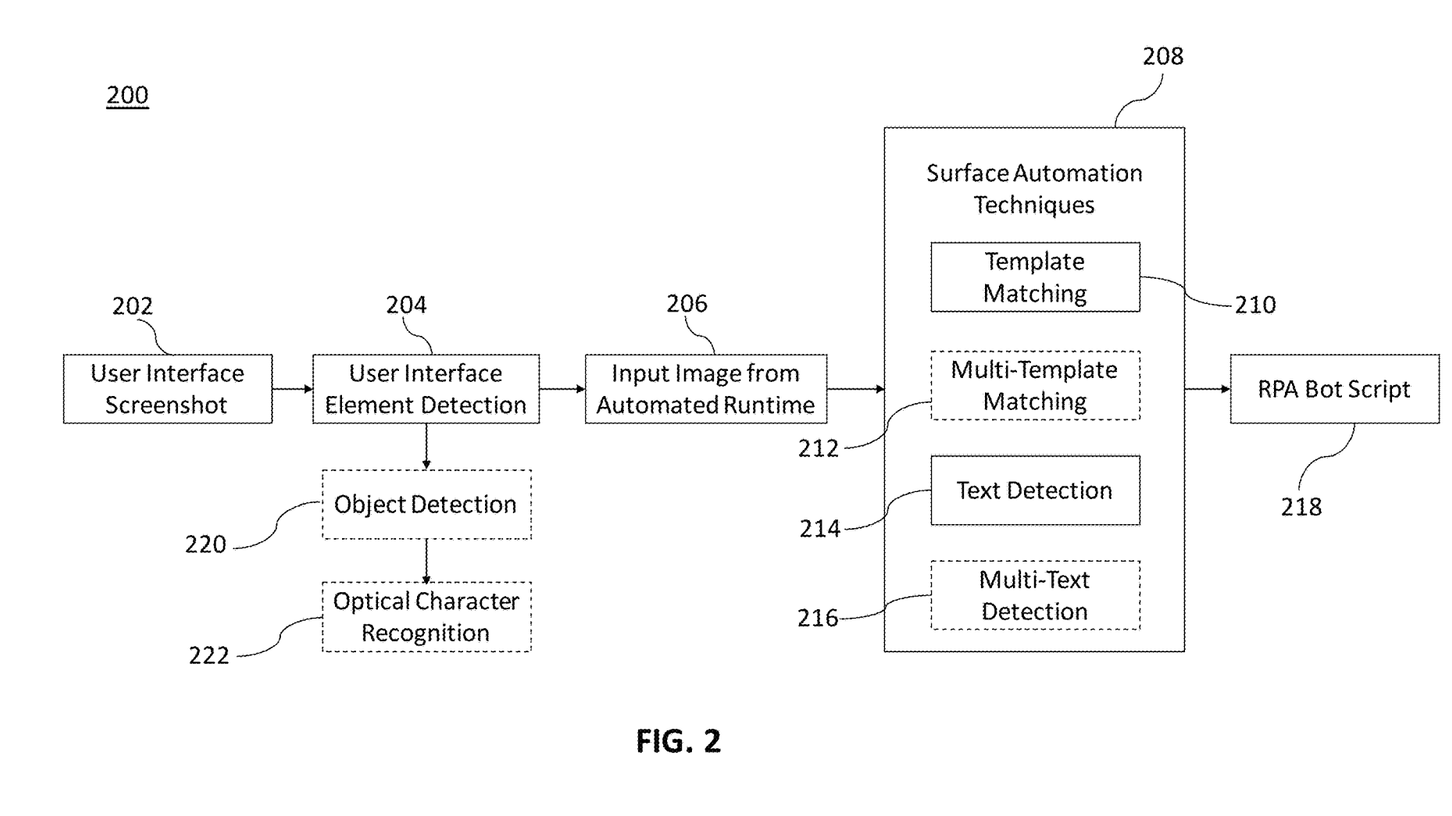
FIG. 2 is a block diagram illustrating an artificial intelligence engine for a surface automation system, according to some embodiments.

FIG. 2 is a block diagram illustrating an artificial intelligence engine utilising surface automation 200, according to some embodiments. Automation engine 200 is configured to detect, recognize, and automate different elements on a given image representing any application page.

During the recording phase 102, the system records scenarios where user interface screenshots 202 and corresponding events are captured and stored. During the enrichment phase 106, the system identifies and stores the coordinates of the image elements, i.e. textual elements and non-textual elements, text, area, and other types of information from the user interface screenshot 202. In some embodiments, the system uses the object detection method to identify the user interface elements 204 on the user interface screenshot 202. In other embodiments, the system uses optical character recognition to identify all textual elements 204 in a user interface screenshot 202.

During the design phase 108, the system determines scenarios of an application for automation and creates an RPA bot capable of performing the programmed set of actions in the automated workflow, according to some embodiments. During automated runtime, the artificial intelligence engine 200 detects these scenarios for automation. After detection, the system captures and stores an input image from automated runtime 206, according to some embodiments.

The system uses various surface automation techniques 208 to identify the target textual and non-textual controls in the input image from automated runtime 206. In an embodiment, template matching 210 is used to recognize the non-textual elements on the input image from automated runtime 206.

Figure 3:
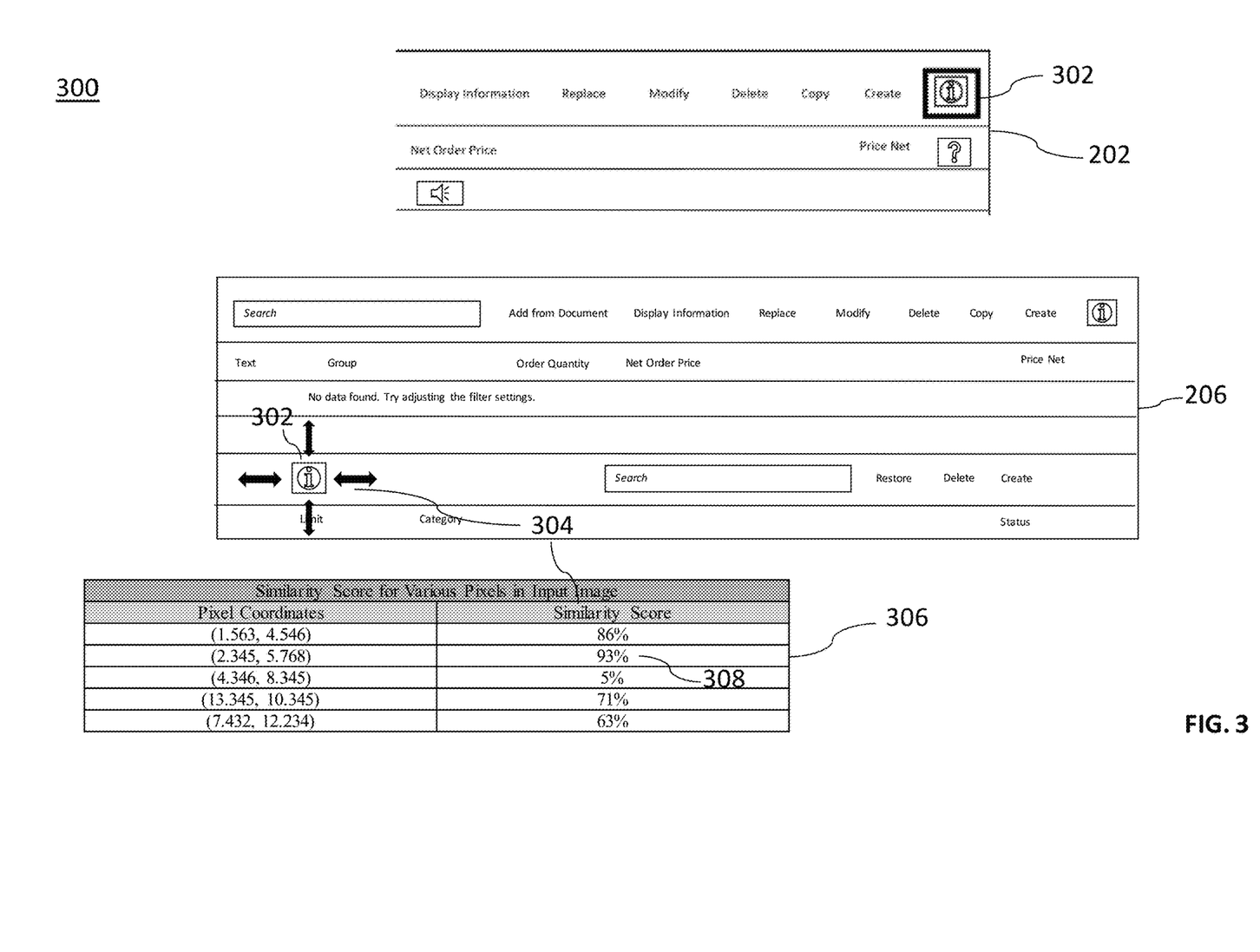
FIG. 3 illustrates an example of template matching, according to some embodiments.

FIG. 3 illustrates an example embodiment of template matching 210. A typical user interface screen contains visual elements for the user to interact with the application, according to some embodiments. Template matching enables the unique detection of those visual elements. During the enrichment phase 106, the system 200 locates non-textual elements from the user interface screenshot 202. The system selects a non-textual element to demarcate from the user interface screenshot 202, according to some embodiments. The system demarcates one or more non-textual elements with an outline. A template 302 is an image patch that has been demarcated with an outline, according to some embodiments. Template matching 210 may then be used to locate and identify this region during automated runtime.

During the design phase 108, an automation workflow 112 is created that implements the template matching processing technique in the RPA automation script 218, according to some embodiments. Template matching 210 occurs by sliding the template 302 across the entire input image from automated runtime 206. A similarity score 304 is then computed at each position. The similarity score at any given position provides how similar the current rectangular region within the input image from automated runtime 206 is to the template 302. In some embodiments, the similarity score 304 is computed for pixels of the image by sliding the template 302 across the entire input image from automated runtime 206. From the calculated similarity scores 306, the position in the input image with the highest similarity score will likely reflect the target non-textual element 308, according to some embodiments.

Figure 4:
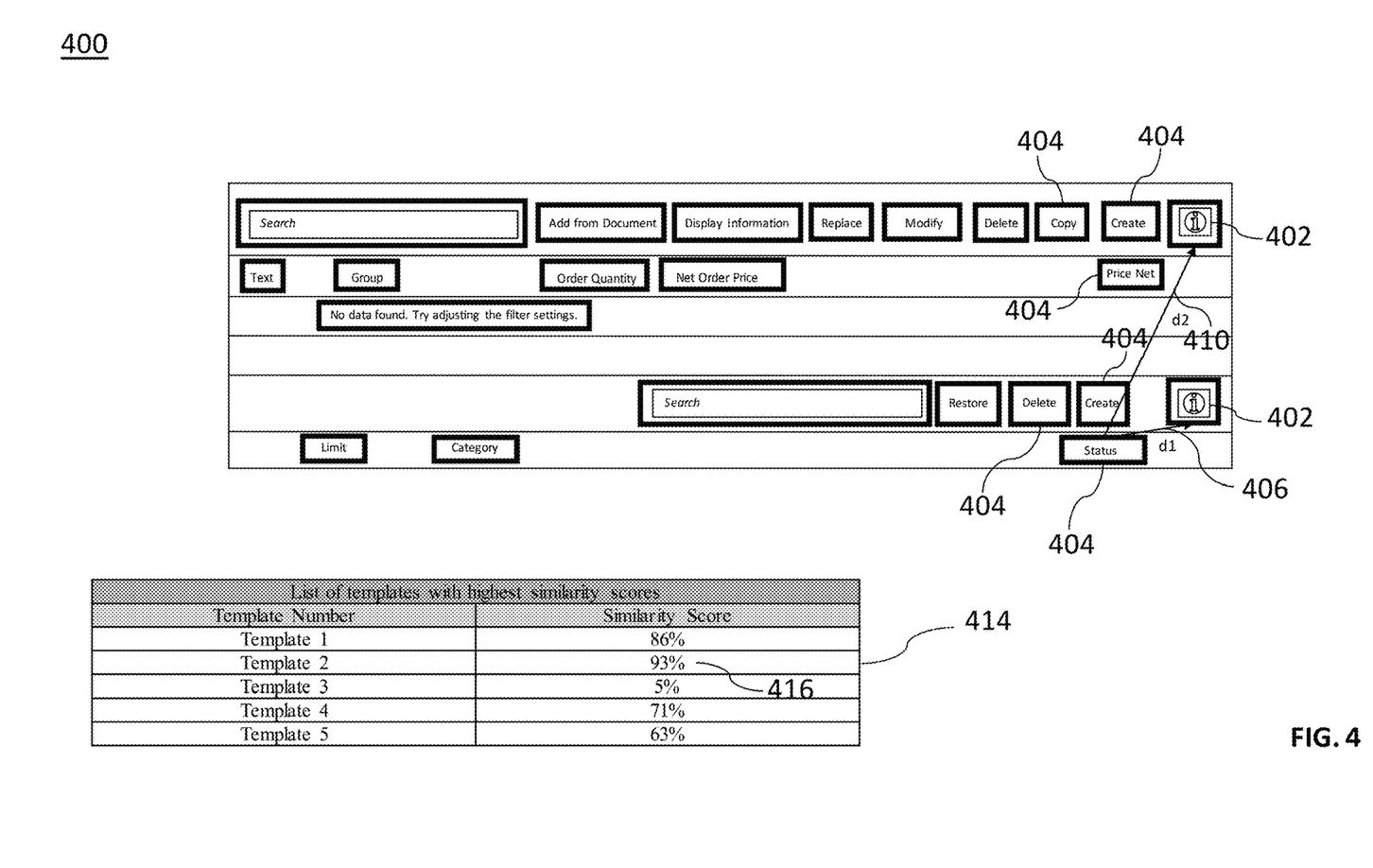
FIG. 4 illustrates an example of multi-template matching, according to some embodiments.

In some embodiments, multi-template matching selection 212 may be utilized to enable surface automation. FIG. 4 illustrates an example embodiment of multi-template matching 212. Multi-template matching 212 may be utilized when there are more than one non-textual elements on a page that appear the identical or similar. In some embodiments, template matching 212 will return the first matching template 302 with highest confidence, in which case, multi-template matching is used in the alternative to detect same or similar non-textual elements.

In some embodiments, the template 402 is labelled based on surrounding textual elements 404 in the user interface screenshot 202. The distance between textual elements and the selected non-textual element 406 is calculated during the enrichment phase. The system stores 408 the templates of the same or similar non-textual elements 402, identified textual elements surrounding the templates 404, and the distance between the textual elements and the selected templates 406. During the play phase 114, the textual elements 404 that were stored during the enrichment phase 106 are located in the input image from automation runtime 206 using a text detection method. The distance stored 406 during the enrichment phase 106 is added to the identified textual elements to locate the coordinates for a target same or similar non-textual elements. In an embodiment, a second distance 410 that was stored during the enrichment phase 204 is also added to the identified textual elements to locate the coordinates for a second target same or similar non-textual elements 412. This process iterates for each same or similar non-textual element contained within the input image from automated runtime 206. Template matching 210 may be performed to create a list of templates 414 that exceed a certain threshold of the similarity score. The template 416 from the list of templates 414 with the highest similarity score nearest to the above calculated reference point is returned.

Figure 5:
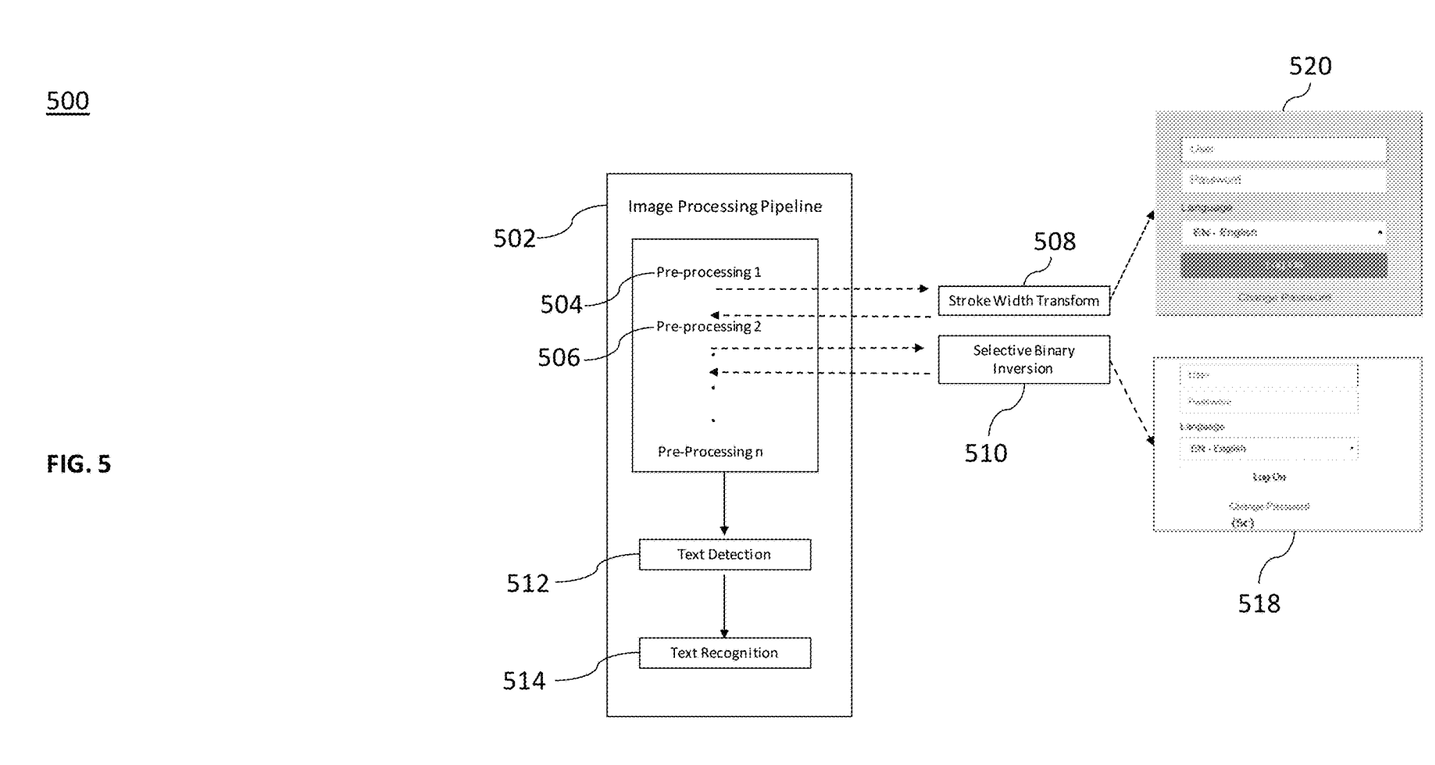
FIG. 5 illustrates an example of a surface automation text detection technique, according to some embodiments.

Various surface automation text detection methods may be used to identify textual elements on an image. FIG. 5 illustrates an example of a surface automation text detection technique 214. A first pre-processing technique 504 may be used to identify the textual elements in an input image during automated runtime 206. A second pre-processing technique 506 may be used to identify segments within an image 206 that may match the segments of the textual elements of the first pre-processing technique 504, in some embodiments. In other embodiments, a second pre-processing technique 506 may be used to identify segments within an image 206 that may identify segments of the textual elements within the image that the first pre-processing technique 504 failed to identify.

As an example, the text detection pipeline 502 may use Stroke Width Transform 508 as its primary pre-processing technique 504. The Stroke Width Transform 508 technique calculates which pixels likely contains the strokes contained within the letters of each textual element within an image. Stroke Width Transform 508 relies on edge images for better accuracy. In image processing, an edge is a set of contiguous pixel positions where an abrupt change of intensity values occur. These edges reflect the boundaries between objects and a background in an image. However, one of the limitations of Stroke Width Transform 508 is that it is sometimes difficult to identify the boundary between objects and the background in an image if the contrast in intensity does not meet a certain threshold 520. This typically occurs when there are various colors within an image 520.

In this scenario, a second text detection technique in addition to the primary pre-processing text detection technique, such as binary inversion 510, may be used for better accuracy in image processing. Binary images are images whose pixels have one of two possible intensity values. Binary images typically produce black and white images to separate an object in the image from the background 518. To encode an image in binary, typically a dark pixel is converted to a value of 0 and a white pixel is converted to a value of 1, or vice versa. However, if the image is not in black and white, it can be converted to grayscale. The allocation of binary values after converting the image to grayscale will depend on whether the value of a certain pixel exceeds a certain threshold.

Before applying the primary pre-processing technique 504 to the input image from automated runtime 206, binary inversion 510 may be applied to the input image to improve the functionality of the primary pre-processing technique 504. By using binary inversion 510, there will be a clear distinction between the objects and background of the image 518. This will enable greater accuracy in the primary pre-processing technique 504 to identify the strokes of the letters within a textual element of an image. Once the textual elements are identified 512 within the input image 206, various image processing algorithms may be used for text recognition 514.

In other embodiments, during the enrichment phase 106, each user interface screenshot 202 may be captured and passed to the image processing pipeline 502 used for text detection and text recognition. As an example, an object model may be created from the image processing pipeline. Using an object model specific to the user interface screenshot 202, text recognition 514 for a target textual element may be used by iterating through the object model in a sequential manner and returning the first control that matches the target textual element in the input image from automated runtime 206.

Figure 6:
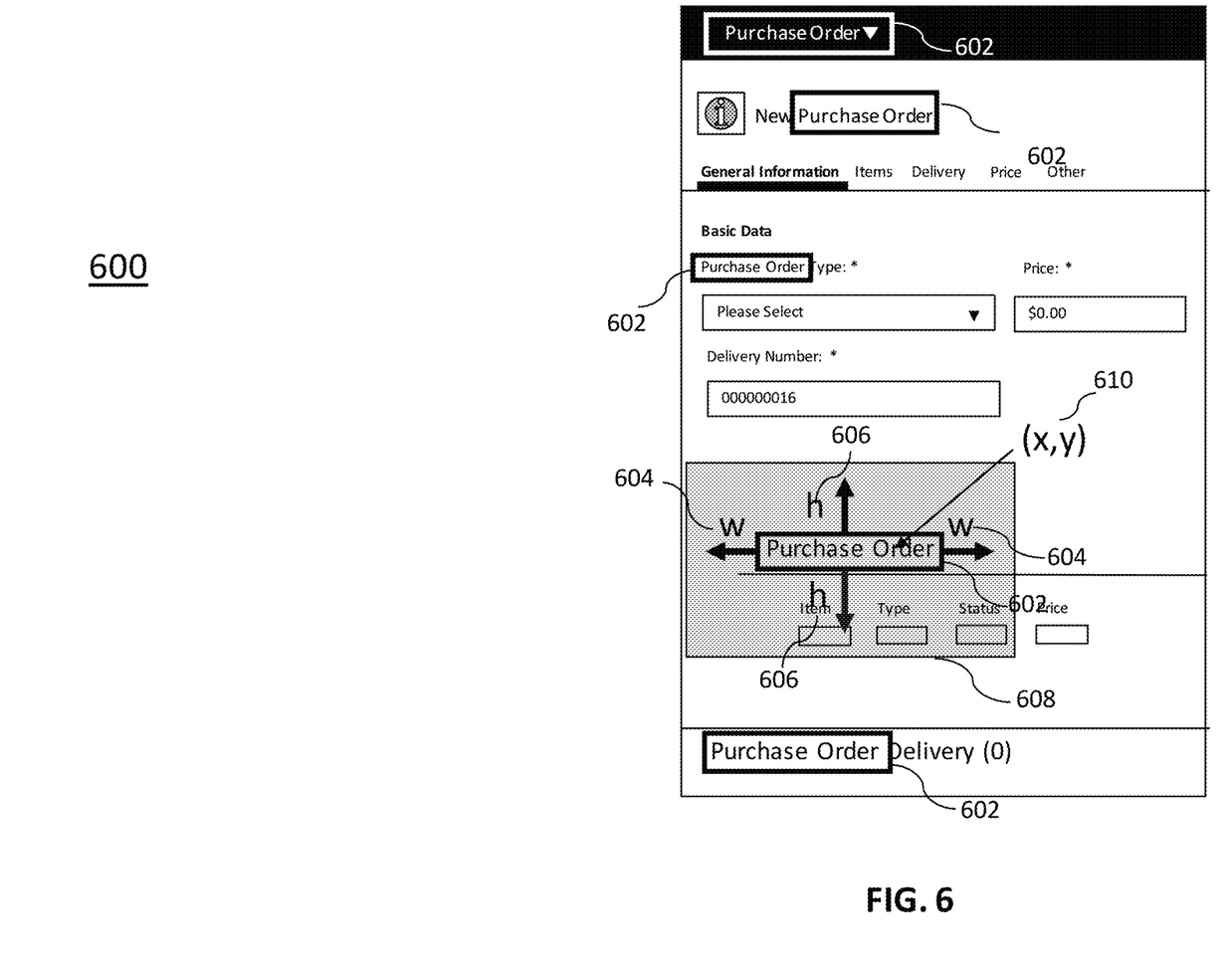
FIG. 6 illustrates an example of multi-text detection during automated runtime, according to some embodiments.

In some embodiments, multi-text detection 216 may be utilized for surface automation. FIG. 6 illustrates an example of multi-text detection during automated runtime 216. Multi-text detection 216 is used for identifying same or similar textual elements 602 present at multiple locations on a single image. Using the object model generated from Optical Character Recognition 514 after identifying the first matching textual element in the user interface screenshot 202, multi-text detection 216 may be applied by traversing the entire object model and creating a list of controls that match the target textual elements 602.

Then, in order to get the right control from the list, a nearest match approach is employed, according to some embodiments. In the nearest match approach, there are two parameters used to locate the right control from the list. One parameter is the nearest match along the width of the image ("w") 604. The second parameter is the nearest match along the height of the image ("h") 606. These two parameters specify the percentage deviation or drift of a control between the recording phase 102 and the play phase 114 due to a change in screen resolution or any other reason.

The coordinates of the text element from the user interface screenshot 204 that was extracted and stored during the enrichment phase 106 is identified. The parameters w 604 and h 606 are then added to the coordinates of the identified text element from the enrichment phase 204. In many embodiments, w 604 and h 606 are added in both directions of the stored coordinates of the textual element from the user interface screenshot 204. In some embodiments, a rectangular object 608 is created to represent the area of the image in which the w and h parameters were added to the coordinates of the text element from the enrichment phase. The textual element nearest to the coordinates of the text element stored during the enrichment phase 204 is returned as the target textual element 602. In some embodiments, the textual element nearest to the coordinates of the text element from the enrichment phase 204 within the rectangular object 608 is returned as the target textual element 602.

As an example, the coordinates (x,y) 610 of the target textual element 602, i.e. the fourth "Purchase Order" from the top of the image, is stored during the enrichment phase. During the play phase 114, the nearest match approach could be employed. The width 604 and height 606 are identified in this image. Due to a change in screen resolution or another reason, the coordinates of the textual control identified during the enrichment phase may have shifted. The parameters w 604 and h 606 are calculated, which signifies the percentage deviation from the textual control "Purchase Order" 602. The parameters w 604 and h 606 are added to the coordinates (x,y) coordinates 610 of the textual element "Purchase Order" 610 identified during the enrichment phase 204. These parameters w 604 and h 606 are added to the coordinates (x, y) 610 to create the rectangular object 608. The RPA automation script 218 iterates over the list of controls that was extracted with the text "Purchase Order" and returns the target textual element 602 nearest to the (x,y) coordinates 610 of the identified textual element from the enrichment phase 204 within the region of the rectangular object 608.

Returning to FIG. 2, the described surface automation techniques 208 enable the extraction of useful semantic information from processes in an application to build a final automation script 218. An event list of the scenarios that was created during the recording phase 102 is also used, in addition to the semantic data extracted from the user interface screenshot 204, to build RPA automation script comprising 218 a sequential set of instructions. In some embodiments, the RPA automation script 218 may be in an object-oriented language such as python or JavaScript. During the play phase 114, the RPA automation script 218 implementing surface automation techniques executes and performs the designated process.

Figure 7:
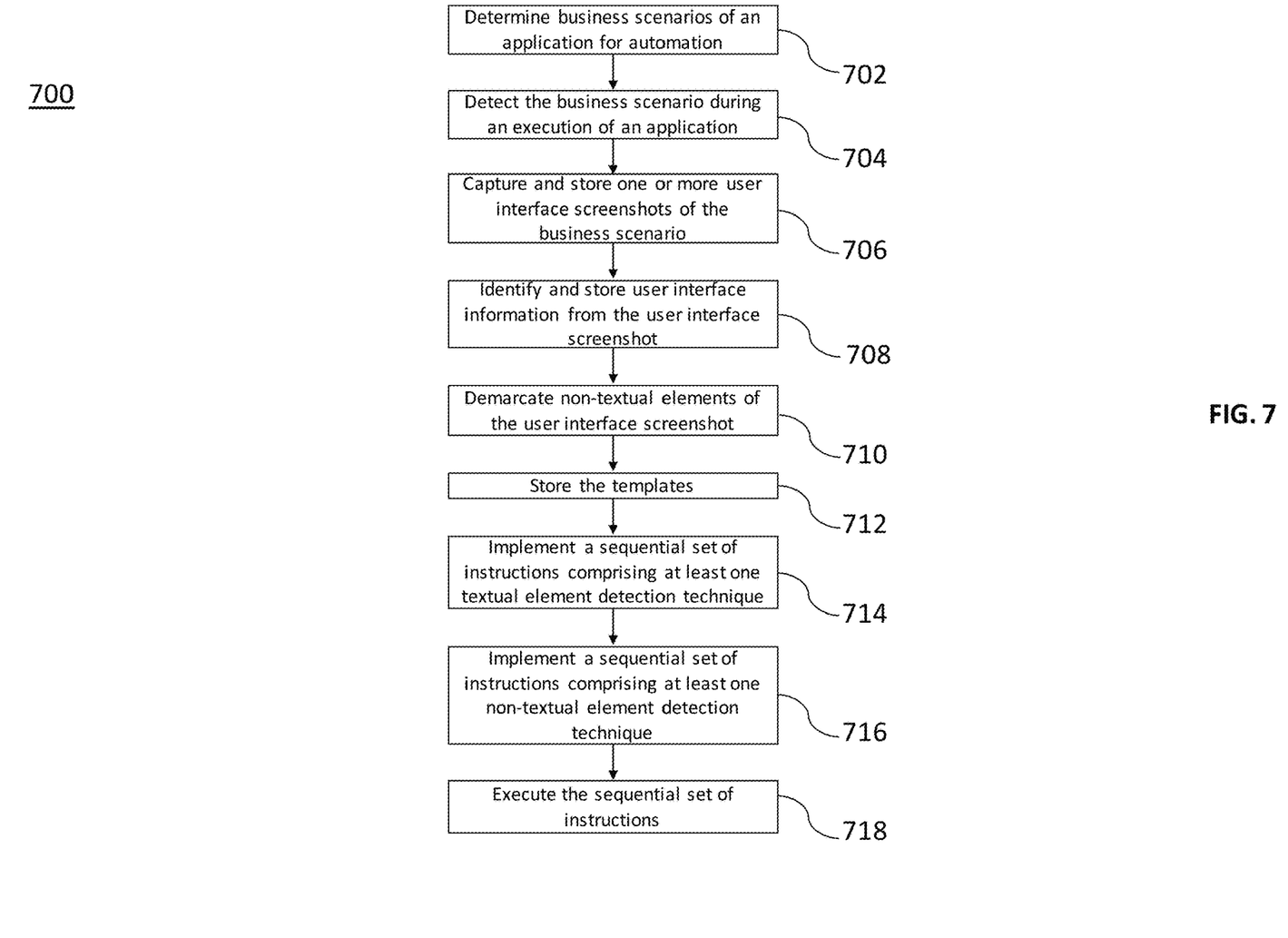
FIG. 7 is a flowchart illustrating a process for surface automation in black box environments, according to some embodiments.

FIG. 7 is a flowchart illustrating a method 700 for surface automation in black box environments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

At 702, scenarios of an application for automation are determined. For example, an automation engine 200 determines various scenarios that may be useful for automating and standardizing repetitive processes in an application with the use of RPA tools.

At 704, the scenario determined during an execution of an application is detected. For example, an automation engine 200 detects the scenario. In some embodiments, the scenario can be based on triggers pre-defined in the automation engine 200. In other embodiments, a RPA developer 104 may manually detect the scenario.

At 706, one or more user interface screenshots of the scenario are captured and stored. For example, an automation engine 200 records a scenario where user interface screenshots 202 and corresponding events are captured and stored.

At 708, user interface information from the user interface screenshot is identified and stored. For example, during the enrich phase 106, system 200 extracts user interface information from the user interface screenshots 202 and stores the information. In some embodiments, this information can include the position of the image elements, text, area, type of different controls present on the screen. In other embodiments, the non-textual and textual elements are identified and stored. In many embodiments, object detection 120 is used to identify the user interface elements. In an embodiment, optical character recognition 122 is used to extract all textual elements in the user interface screenshots 118.

At 710, non-textual elements of the user interface screenshot are demarcated. For example, an automation engine 200 system selects a non-textual element to demarcate from the user interface screenshot 202, according to some embodiments. The automation engine 200 demarcates one or more non-textual elements with an outline 302. A template 302 is an image patch that has been demarcated with an outline, according to some embodiments. Template matching 210 may then be used to locate and identify this region during automated runtime.

At 712, the templates are stored. For example, the automation engine may store the templates extracted from the user interface screenshot at step 710.

At 714, a sequential set of instructions comprising at least one textual element detection technique may be implemented. For example, an automation engine 200 implements or designs an automation workflow that implements surface automation techniques 126, including template matching 128, text detection 130, multi-template matching 132, or multi-text detection 134. In an embodiment, an RPA bot capable of performing the programmed set of actions in the automated workflow is created 124.

For example, a first pre-processing technique 504 may be used to identify the textual elements in an input image during automated runtime 206. A second pre-processing technique 506 may be used to identify segments within an image 206 that may match the segments of the textual elements of the first pre-processing technique 504, in some embodiments. In other embodiments, a second pre-processing technique 506 may be used to identify segments within an image 206 that may identify segments of the textual elements within the image that the first pre-processing technique 504 failed to identify. In another example, multi-text detection 134 from FIG. 6 may be used.

At 716, a sequential set of instructions comprising at least one non-textual element detection technique may be implemented. For example, template matching 210 may be implemented by sliding the template 302 across the entire input image from automated runtime 206. A similarity score 304 is then computed at each position. The similarity score at any given position provides how similar the current rectangular region within the input image from automated runtime 206 is to the template 302. In some embodiments, the similarity score 304 is computed for all pixels of the image by sliding the template 302 across the entire input image from automated runtime 206. From the calculated similarity scores 306, the position in the input image with the highest similarity score will likely reflect the target non-textual element 308, according to some embodiments. In some other embodiments, multi-template matching may be used.

At 718, the sequential set of instructions are executed. For example, the automation engine executes a sequential set of instructions implementing the surface automation techniques 126 applied to the data extracted from the enrichment phase 106. In another embodiment, an event list of the scenarios that was created during the recording phase 102 is also used, in addition to the semantic data extracted from the user interface screenshot 204, to build a sequential set of instructions.

Figure 8:
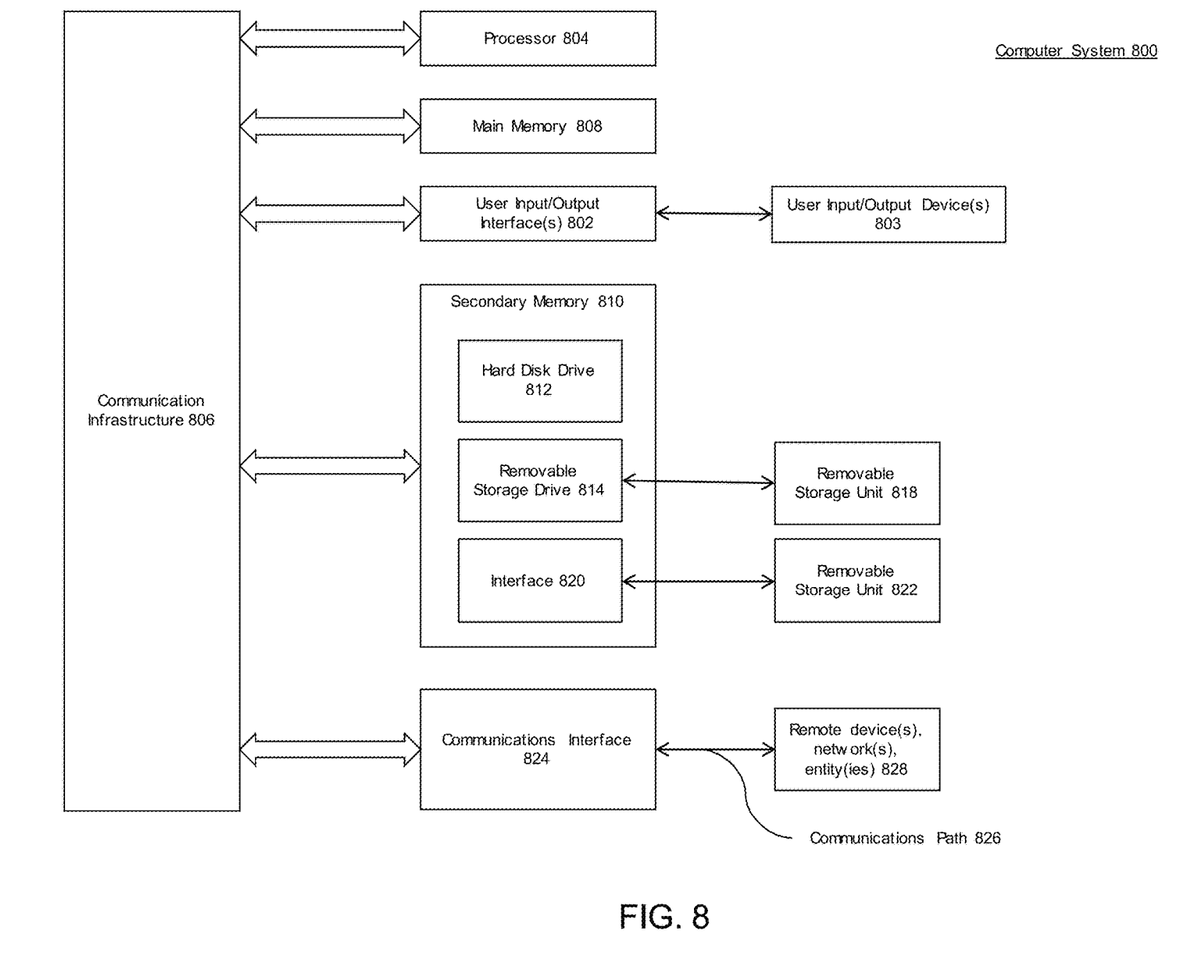
FIG. 8 is an example computer system useful for implementing various embodiments.

Various embodiments can be implemented, for example, using one or more computer systems, such as computer system 800 shown in FIG. 8. Computer system 800 can be used, for example, to implement method 700 of FIG. 700. For example, computer system 800 can implement and execute a set of instructions comprising a non-textual element detection technique and a textual element detection technique. Computer system 800 can be any computer capable of performing the functions described herein.

Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

determining a scenario of an application for automation, the scenario comprising a user-executable process of the application;

detecting the scenario during an execution of the application;

capturing and storing one or more user interface screenshots of the application taken during execution of the scenario;

identifying and storing user interface information from the one or more user interface screenshots comprising at least target textual elements and target non-textual elements of the one or more user interface screenshots, wherein the user interface information comprises at least one of coordinates of the target textual elements or coordinates of the target non-textual elements;

demarcating the target non-textual elements of the one or more user interface screenshots, wherein the demarcated target non-textual elements of the one or more user interface screenshots are a plurality of templates;

storing the plurality of templates;

implementing a sequential set of instructions to automate the scenario, the sequential set of instructions comprising:

at least one textual element detection technique, wherein a pre-processing image technique identifies textual elements that match target textual elements from the one or more user interface screenshots; and at least one non-textual element detection technique, wherein the at least one non-textual element detection technique includes template matching comprising sliding a template from the plurality of templates through a plurality of positions of an automated runtime image, computing a similarity score of the template at each position, wherein the similarity score determines how similar each position in the plurality of positions in the automated runtime image is to the template, and selecting a highest score from the similarity scores to determine a most likely position of a non-textual element of the automated runtime input image that matches the target non-textual element associated with the template; and executing the sequential set of instructions, wherein the execution of the sequential set of instructions comprises automatically implementing the scenario of the application.

2. The method of claim 1, wherein the at least one textual element detection technique comprises:
using a first pre-processing image technique that identifies textual elements from an automated runtime input image; and
using a second pre-processing image technique that is different from the first pre-processing image technique that identifies textual elements within the automated runtime input image that the first pre-processing image technique may not have identified.

3. The method of claim 2, wherein the at least one textual detection technique further comprises:
iterating through an object model specific to one of the one or more user interface screenshots in a sequential manner to detect a textual element from the automated runtime input image that matches a target textual element from the one or more user interface screenshots after using the second pre-processing technique.

4. The method of claim 1, wherein the at least one non-textual element detection technique further comprises:
locating a textual element in an automation runtime input image that matches a textual element stored in association with a template in the plurality of templates;
utilizing a first distance associated with the stored textual element to locate a first reference point in the automation runtime image;
utilizing a second distance associated with the stored textual element to locate a second reference point in the automation runtime image;
matching the template to a first non-textual element of the automation runtime image based on the first reference point; and
matching the template to a second non-textual element of the automation runtime image based on the second reference point.

5. The method of claim 1, wherein the at least one textual element detection technique comprises:
detecting a plurality of textual elements in an automated runtime input image that match a target textual element from the one or more user interface screenshots;
identifying one of the plurality of textual elements in the automated runtime image that is nearest to stored coordinates associated with the target textual element within a rectangle defined based on the stored coordinates associated with the target textual element, a height parameter, and a width parameter, wherein the height parameter and the width parameter collectively specify a percent deviation of a control location between a recording phase and a recognition phase.

6. A system, comprising:
a memory; and
at least one processor coupled to the memory and configured to:
determine a scenario of an application for automation, the scenario comprising a user-executable process of the application;
detect the scenario during an execution of the application;
capture and store one or more user interface screenshots of the application taken during execution of the scenario;
identify and store user interface information from the one or more user interface screenshots comprising at least target textual elements and target non-textual elements of the one or more user interface screenshots, wherein the user interface information comprises at least one of coordinates of the target textual elements or coordinates of the target non-textual elements;
demarcate the target non-textual elements of the one or more user interface screenshots, wherein the demarcated target non-textual elements of the one or more user interface screenshots are a plurality of templates;
store the plurality of templates;
implement a sequential set of instructions to automate the scenario, the sequential set of instructions comprising:
a textual element detection technique, wherein a pre-processing image technique identifies textual elements that match target textual elements from the one or more user interface screenshots; and
a non-textual element detection technique, wherein the non-textual element detection technique includes template matching comprising
sliding a template from the plurality of templates through a plurality of positions of an automated runtime image,
computing a similarity score of the template at each position, wherein the similarity score determines how similar each position in the plurality of positions in the automated runtime image is to the template, and
selecting a highest score from the similarity scores to determine a most likely position of a non-textual element of the automated runtime input image that matches the target non-textual element associated with the template; and
execute the sequential set of instructions, wherein the execution of the sequential set of instructions comprises automatically implementing the scenario of the application.

7. The system of claim 6, wherein the textual element detection technique comprises:
using a first pre-processing image technique that identifies textual elements from an automated runtime input image; and
using a second pre-processing image technique that is different from the first pre-processing image technique that identifies textual elements within the automated runtime input image that the first pre-processing image technique may not have identified.

8. The system of claim 7, wherein the textual element detection technique further comprises:
iterating through an object model specific to one of the one or more user interface screenshots in a sequential manner to detect a textual element from the automated runtime input image that matches a target textual element from the one or more user interface screenshots after using the second pre-processing technique.

9. The system of claim 6, wherein the non-textual element detection technique further comprises:
locating a textual element in an automation runtime input image that matches a textual element stored in association with a template in the plurality of templates;

utilizing a first distance associated with the stored textual element to locate a first reference point in the automation runtime image;
utilizing a second distance associated with the stored textual element to locate a second reference point in the automation runtime image;
matching the template to a first non-textual element of the automation runtime image based on the first reference point; and
matching the template to a second non-textual element of the automation runtime image based on the second reference point.

10. The system of claim 6, wherein the textual element detection technique comprises:
detecting a plurality of textual elements in an automated runtime input image that match a target textual element from the one or more user interface screenshots;
identifying one of the plurality of textual elements in the automated runtime image that is nearest to stored coordinates associated with the target textual element within a rectangle defined based on the stored coordinates associated with the target textual element, a height parameter, and a width parameter, wherein the height parameter and the width parameter collectively specify a percent deviation of a control location between a recording phase and a recognition phase.

11. A non-transitory computer-readable medium having instructions stored thereon that, when executed by at least one computing device, cause the at least one computing device to perform operations comprising:
determining a scenario of an application for automation, the scenario comprising a user-executable process of the application;
detecting the scenario during an execution of the application;
capturing and storing one or more user interface screenshots of the application taken during execution of the scenario;
identifying user interface information from the one or more user interface screenshots comprising at least target textual elements and target non-textual elements of the one or more user interface screenshots, wherein the user interface information comprises at least one of coordinates of the target textual elements or coordinates of the target non-textual elements;
demarcating the target non-textual elements of the one or more user interface screenshots, wherein the demarcated target non-textual elements of the one or more user interface screenshots are a plurality of templates;
storing the plurality of templates;
implementing a sequential set of instructions to automate the scenario, the sequential set of instructions comprising:
a textual element detection technique, wherein a pre-processing image technique identifies textual elements that match target textual elements from the one or more user interface screenshots; and
a non-textual element detection technique, wherein the non-textual element detection technique includes template matching comprising
sliding a template from the plurality of templates through a plurality of positions of an automated runtime image,
computing a similarity score of the template at each position, wherein the similarity score determines how similar each position in the plurality of positions in the automated runtime image is to the template, and
selecting a highest score from the similarity scores to determine a most likely position of a non-textual element of the automated runtime input image that matches the target non-textual element associated with the template; and
executing the sequential set of instructions, wherein the execution of the sequential set of instructions comprises automatically implementing the scenario of the application.

12. The non-transitory computer-readable medium of claim 11, wherein the textual element detection technique comprises:
using a first pre-processing image technique that identifies textual elements from an automated runtime input image; and
using a second pre-processing image technique that is different from the first pre-processing image technique that identifies textual elements within the automated runtime image that the first pre-processing image technique may not have identified.

13. The non-transitory computer-readable medium of claim 12, wherein the textual element detection technique comprises:
iterating through an object model specific to one of the one or more user interface screenshots in a sequential manner to detect a textual element from the automated runtime input image that matches a target textual element from the one or more user interface screenshots after using the second pre-processing technique.

14. The non-transitory computer-readable medium of claim 11, wherein the non-textual element detection technique further comprises: locating a textual element in an automation runtime input image that matches a textual element stored in association with a template in the plurality of templates; utilizing a first distance associated with the stored textual element to locate a first reference point in the automation runtime image; utilizing a second distance associated with the stored textual element to locate a second reference point in the automation runtime image; matching the template to a first non-textual element of the automation runtime image based on the first reference point; and matching the template to a second non-textual element of the automation runtime image based on the second reference point.

15. The non-transitory computer-readable medium of claim 11, wherein the textual element detection technique comprises:
detecting a plurality of textual elements in an automated runtime input image that match a target textual element from the one or more user interface screenshots;
identifying one of the plurality of textual elements in the automated runtime image that is nearest to stored coordinates associated with the target textual element within a rectangle defined based on the stored coordinates associated with the target textual element, a height parameter, and a width parameter, wherein the height parameter and the width parameter collectively specify a percent deviation of a control location between a recording phase and a recognition phase.

16. The method of claim 2, wherein the first pre-processing image technique comprises a stroke width transform technique and the second pre-processing image technique comprises a binary inversion technique.

17. The system of claim 7, wherein the first pre-processing image technique comprises a stroke width transform technique and the second pre-processing image technique comprises a binary inversion technique.

18. The method of claim 1, wherein sliding the template from the plurality of templates through the plurality of positions of the automated runtime image comprises sliding the template from the plurality of templates across the entire automated runtime image.

19. The system of claim 6, wherein sliding the template from the plurality of templates through the plurality of positions of the automated runtime image comprises sliding the template from the plurality of templates across the entire automated runtime image.

20. The non-transitory computer-readable medium of claim 11, wherein sliding the template from the plurality of templates through the plurality of positions of the automated runtime image comprises sliding the template from the plurality of templates across the entire automated runtime image.

\* \* \* \* \*